United States Patent [19]

Brothers et al.

[11] Patent Number: 4,548,042
[45] Date of Patent: Oct. 22, 1985

[54] PROPULSION SYSTEM

[76] Inventors: Luther C. Brothers, Seminole Trail, Wilmington, N.C. 28403; Michael R. Leimone, 2020 H Fall Dr., Wilmington, N.C. 28401

[21] Appl. No.: 596,256

[22] Filed: Apr. 3, 1984

Related U.S. Application Data

[63] Continuation-in-part of Ser. No. 399,345, Jul. 19, 1982, abandoned, which is a continuation of Ser. No. 123,174, Feb. 10, 1980, abandoned.

[51] Int. Cl.$^4$ ................................................ B60K 1/00
[52] U.S. Cl. ..................................... 60/668; 180/65.1
[58] Field of Search ............... 180/65.2, 65.1; 60/668, 60/407, 412, 670

[56] References Cited

U.S. PATENT DOCUMENTS

| | | | |
|---|---|---|---|
| 3,367,438 | 2/1968 | Moore | 180/65.2 |
| 3,367,440 | 2/1968 | Becker | 180/65.2 |

*Primary Examiner*—Allen M. Ostrager
*Attorney, Agent, or Firm*—Bell, Seltzer, Park & Gibson

[57] ABSTRACT

An internal combustion engine propulsion system is retrofitted by removing the pistons, valves and related parts and remounting the crank shaft on low friction bearings so that it may serve as a free wheeling mechanical energy storing device. The crank shaft is powered through linkage to a battery powered electric motor and connects, through a conventional internal combustion engine flywheel, to the drive train.

8 Claims, 1 Drawing Figure

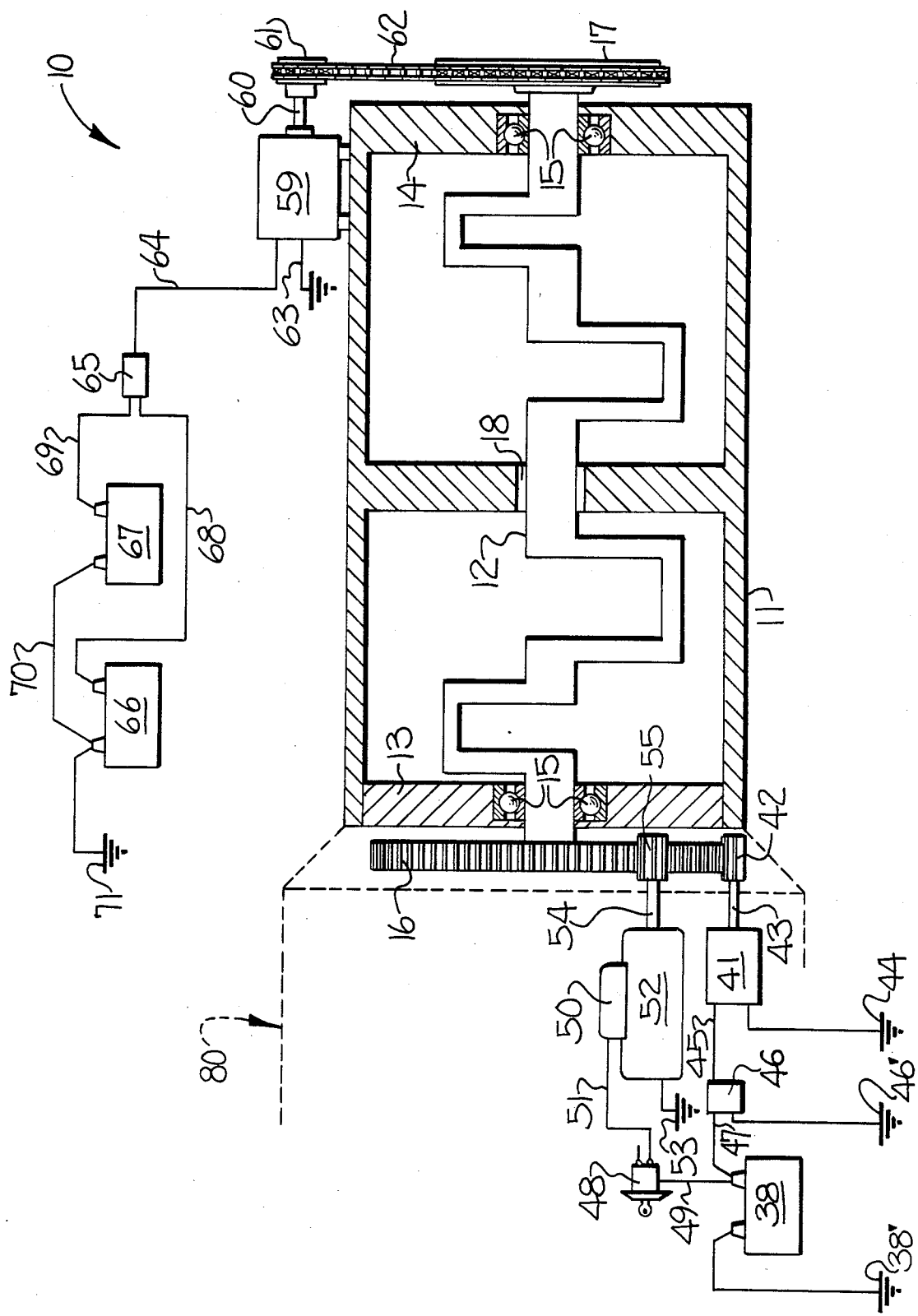

PROPULSION SYSTEM

CROSS REFERENCE TO RELATED APPLICATIONS

This application is a continuation-in-part of Ser. No. 399,345, filed July 19, 1982, now abandoned which is a continuation of Ser. No. 123,174, filed Feb. 10, 1980, now abandoned.

BACKGROUND OF THE INVENTION

1. Field of the Invention

The invention relates to electric propulsion systems and, more particularly, to the retrofitting of conventional internal combustion engine systems to form electrical propulsion systems.

2. Prior Art

In the past various attempts have been made to produce more efficient propulsion systems. This is particularly true in the area vehicular transportation. Some of these earlier attempts have included electric cars with rechargeable but extremely heavy battery packs as well as modifications to internal combustion engines such as rendering part of the pistons inoperative. Flywheel type propulsion systems have been proposed and experimented with; however, there is no known system for retrofitting a conventional internal combustion engine, using many of the parts of such engine, to provide the structural foundation for an electrical propulsion system.

SUMMARY OF THE INVENTION

The present provides a novel electrical vehicular propulsion formed by retrofitting a conventional internal combustion system, while utilizing the counterbalanced crank shaft of the internal combustion engine in a free wheeling mode as a mechanical energy storing device.

Broadly, the present invention comprises a conventional internal combustion engine block from which the pistons, valves and other related parts that mechanically interact with the crank shaft have been removed. A conventional internal combustion engine crank shaft of the type normally associated with the engine block is mounted on low friction bearings for free wheeling rotation within the block. An electrical drive motor is mechanically linked to drive the crank shaft and the drive train. The free wheeling crank shaft is counterbalanced and includes portions offset from the rotational center thereof that serve as flyweights during rotation of the crank shaft. Thus, the crank shaft stores mechanical energy and thereby enhances the operating efficiency of the propulsion system.

In accordance with the illustrated embodiment of the invention, a conventional internal combustion engine flywheel is connected to the crank shaft at the crank shaft end opposite its linkage to the electrical drive motor such that the flywheel and crank shaft operate together as a composite flyweight/flywheel assembly for storing mechanical energy.

According to the present invention there is also disclosed a method of retrofitting a conventional internal combustion engine vehicular propulsion system to form an electrical vehicular propulsion system.

Thus, according to the present invention, there is provided an electrical vehicular propulsion system utilizing the block and crank shaft of a conventional internal combustion engine. Pursuant to this object, the crank shaft if mounted on free turning bearings, e.g. ball bearings, that replace the standard main bearings.

BRIEF DESCRIPTION OF THE FIGURE

The FIGURE is a somewhat schematic representation of the propulsion system of the present invention.

DETAILED DESCRIPTION OF THE INVENTION

While the present invention will be described more fully hereinafter with reference to the accompanying drawing FIGURE, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

With reference to the drawing FIGURE, the propulsion system of the present invention, indicated generally at 10, is an electric propulsion system formed by retrofitting a conventional internal combustion engine system.

Propulsion system 10 includes a conventional internal combustion engine block 11 from which the pistons, valves and other related parts that mechanically interact with the crank shaft thereof have been removed. Although any number of different blocks can be used, the block of a Volkswagen air-cooled engine has proved satisfactory for this purpose.

A conventional internal combustion engine crank shaft 12 of the type normally associated with the engine block 11 is rotatably supported between block ends 13 and 14 in block 11 by low friction ball bearings 15 as can clearly be seen in the FIGURE. These bearings are installed in the normal manner after sizing the block for the same. Although ball bearings have been found to work extremely well to provide a free wheeling effect for the crank shaft, it is to be understood that needle bearings, roller bearings or the like could also be used with success. As discussed in detail below, the free wheeling crank shaft serves to store mechanical energy and promote the efficient operation of system 10.

It should be noted that it is not necessary to replace any of the main bearings of the crank shaft except at the ends 13 and 14. As illustrated in the drawing, the intermediate bearing normally used at 18 has been eliminated completely since reduction of friction for a free wheeling effect is an important feature of the present invention.

An electric drive motor 59 is mounted on block 11 and includes a drive shaft 60 having a pulley 61 fixedly secured thereto. A drive belt 62 is trained around pulleys 61 and 17 to mechanically link drive motor 59 to crank shaft 12 and thereby rotate the crank shaft about its rotational center.

Motor 59 is grounded at 63 and through line 64 is connected to an operator controlled rheostat 65. The rheostat is operatively connected to one side of each of a pair of electrical batteries 66, 67 by lines 68, 69, respectively. The other side of each of the two latter mentioned batteries are grounded through line 70 and ground 71. Rheostat 65 permits the operator to drive the system at a selected RPM and is preferably operated by a foot pedal.

A standard drive train for the type engine block 11 is indicated generally at 80. This drive train would, of course, include all of the standard parts such as clutch, pressure plate, gear differential, and the like. Since the block 11 is preferably modified from a standard internal combustion engine block, the drive train in unmodified form is available and is, of course, well known to those skilled in the art.

A starter system for propulsion system 10 includes a starter motor 52 having a rotatable shaft 54 with a flywheel engaging drive unit 55. A bendix or similar mechanism (not shown) is provided to disengage flywheel 16 when the speed of the flywheel exceeds the speed of drive unit 55. Since mechanisms of this type are commonly known, further description of the same is deemed unnecessary.

A generator or alternator 41 is driven by flywheel 16 through gear drive 42 and shaft 43. This generator or alternator is grounded at 44 and includes a current transmission line 45 connected to a voltage regulator 46 which is grounded at 46'. This regulator is in turn connected to a conventional automobile battery 38 through line 47.

A standard ignition or key switch 48 is provided which is operatively connected to battery 38 by line 49. The key switch 48 is also operatively connected to a starter solenoid 50 by line 51. Solenoid 50 is operatively connected to starter motor 52 in the normal manner with the circuit being completed therethrough to ground 53.

To operate the propulsion system 10, key switch 48 is manipulated to allow current from battery 38 to pass through lines 49 and 51 to stater solenoid 50. This energizes starter 52 through respective ground system 53 and 38' to cause shaft 54 and its associated drive gear 55 to rotate. This in turn rotates flywheel 16 that turns the free wheeling crank shaft 12 mounted on bearings 15 within block 11.

Once adequate RPM of shaft 12 has been obtained, rheostat 65 can be manipulated to send current from batteries 66, 67 to electric drive motor 59. As motor 59 rotates shaft 60, pulley 61 will drive belt 62 which in turn drives pulley 17 connected to the crank shaft 12.

In case of failure of the primary electrical system for driving the drive train through motor 59, an emergency system employing starter 50 can be used to turn crank shaft 12 to drive the system of the present invention. This would be used in emergency situations which would allow, for example, a vehicle with the present system installed thereon to reach a point of safety or a location where help is available.

It will be appreciated that the free wheeling crank shaft 12 includes portions offset from the rotational center thereof that serve as flyweights during rotation of the crank shaft. This permits the crank shaft to store mechanical energy during operation of the propulsion system, and particularly at those times where an associated vehicle is "coasting" or at rest. During such coasting or rest periods the crank shaft, through the mentioned linkage, serves to continue rotation of motor shaft 60 so that the motor may, in effect, operate as an alternator or generator to replenish electrical current used during operation of the system to batteries 67, 68. In this manner, the free wheeling crank shaft serves to enhance the electrical operating efficiency of the propulsion system. Further, the "flywheel" effect of crank shaft 12 lends mechanical operating stability and efficiency to the system.

It will be appreciated that while the crank shaft 12 may operate alone as the flyweight system of the propulsion system, in the illustrated embodiment the crank shaft 12 and flywheel 16 operate together as a composite flyweight/flywheel assembly for storing mechanical energy.

The present invention may, of course, be carried out in specific ways other than those herein set forth without departing from the spirit and essential characteristics of the invention. The present embodiments are, therefore, to be considered in all respects as illustrative and not restrictive and all changes coming within the meaning and equivalancy range of the appended claims are intended to be embraced therein.

What is claimed is:

1. An electrical vehicular propulsion system formed by retrofitting a conventional internal combustion propulsion system and comprising:

a conventional internal combustion engine block from which the pistons, valves and other related parts that mechanically interact with the crank shaft thereof have been removed;

a conventional internal combustion engine crank shaft of the type normally associated with said engine block;

low friction bearings at the respective ends of said engine block for mounting said crank shaft for freewheeling rotation within the block;

an electrical drive motor mechanically linked to said crank shaft for imparting rotational movement to the crank shaft about the rotational center thereof;

electrical battery means for powering the drive motor;

a drive train operatively connected to said crank shaft;

said crank shaft including portions offset from the rotational center thereof serving as flyweights during rotation of the crank shaft, such that the crank shaft may store mechanical energy and thereby enhance the operating efficiency of the propulsion system.

2. An electrical vehicular propulsion system as claimed in claim 1 including a conventional internal combustion engine flywheel connected to said crank shaft at the crank shaft end opposite from its linkage to the drive motor, said flywheel and crank shaft operating together as a composite flyweight/flywheel assembly for storing mechanical energy.

3. An electrical vehicular propulsion system as claimed in claim 2 including a starter system comprising an electric starter motor mechanically coupled to said flywheel and an associated starter battery and ignition switch.

4. An electrical vehicular propulsion system as claimed in claim 1 including an operator controlled rheostat between said drive motor and said battery means.

5. An electrical vehicular propulsion system as claimed in claim 4 including a foot pedal for controlling said rheostat.

6. An electrical vehicular propulsion system as claimed in claim 1 wherein said electrical drive motor is mechanically linked to said crank shaft by a pulley/belt linkage.

7. An electrical vehicular propulsion system formed by retrofitting a conventional internal combustion propulsion system and comprising:

a conventional internal combustion engine block from which the pistons, valves and other related parts that mechanically interact with the crank shaft thereof have been removed;

a conventional internal combustion engine crank shaft of the type normally associated with said engine block, said crank shaft including portions offset from the rotational center thereof serving as flyweights during rotation of the crankshaft;

low friction bearings at the respective ends of said engine block for mounting said crank shaft for freewheeling rotation within the block;

an electrical drive motor mechanically linked to said crank shaft for imparting rotational movement to the crank shaft about the rotational center thereof;

electrical battery means for powering the drive motor;

an operator controlled rheostat between said drive motor and said battery means;

a drive train operatively connected to said crank shaft;

a conventional internal combustion engine flywheel connected to said crank shaft at the crank shaft end opposite from its linkage to the drive motor;

a starter system comprising an electric starter motor mechanically coupled to said flywheel and an associated battery and ignition switch;

said flywheel and crank shaft operating as a composite flyweight/flywheel assembly for storing mechanical energy and thereby enhancing the operating efficiency of the propulsion system.

8. A method of retrofitting a conventional internal combustion engine vehicular propulsion system, comprising the steps of:

removing from a conventional internal combustion engine block the pistons, valves and other related parts that mechanically interact with the crank shaft thereof;

removing the main bearings on which the crank shaft rotates and replacing them with low friction bearings at the respective ends of the engine block, thereby providing a free wheeling crank shaft;

adding an electric drive motor and an associated battery and mechanically linking the drive motor to one end of the crank shaft;

retaining the conventional internal combustion engine flywheel and connecting the flywheel to the crank shaft at the end opposite its linkage to the drive motor;

retaining the starter motor and mechanically coupling the starter motor to the flywheel; and retaining the drive train in operative association with the crank shaft through the flywheel whereby the flywheel and crank shaft operate together as a composite flyweight/flywheel assembly for storing mechanical energy and thereby enhancing the operating efficiency of the propulsion system.

* * * * *